Figure 1:
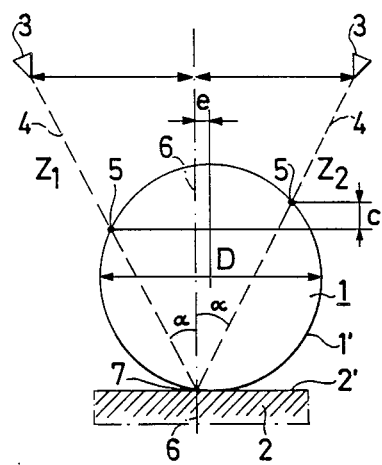

United States Patent [19]

Dutina

[11] Patent Number: 4,982,772
[45] Date of Patent: Jan. 8, 1991

[54] METHOD IN DETERMINING PRIMARILY THE FORM AND/OR THE POSITION OF ELONGATE TIMBER ITEMS AND APPARATUS FOR CARRYING OUT THE METHOD

[75] Inventor: Hans Dutina, Saltsjö-Boo, Sweden

[73] Assignee: Hans Dutina Research & Development AB, Saltsjö Boo, Sweden

[21] Appl. No.: 101,428

[22] Filed: Sep. 28, 1987

[30] Foreign Application Priority Data

Sep. 30, 1986 [SE] Sweden ................. 8604146

[51] Int. Cl.$^5$ ........................ B27B 1/00; B26D 5/00
[52] U.S. Cl. ................................. 144/357; 83/72; 83/364; 83/365; 83/371; 144/378
[58] Field of Search ............... 83/72, 371, 364, 365, 83/367; 144/209 R, 209 A, 356, 357, 378; 250/560, 578; 356/376, 383, 384, 385, 386

[56] References Cited

U.S. PATENT DOCUMENTS

| | | | |
|---|---|---|---|
| 3,806,253 | 4/1974 | Denton | 144/357 |
| 3,897,156 | 7/1975 | Chasson | 144/357 |
| 4,139,035 | 2/1979 | Bystedt et al. | 144/357 |

FOREIGN PATENT DOCUMENTS

86/01590  3/1986  World Int. Prop. O. ......... 144/387

*Primary Examiner*—W. Donald Bray
*Attorney, Agent, or Firm*—Nies, Kurz, Bergert & Tamburro

[57] ABSTRACT

Method and apparatus for scaling, sorting, processing, cutting-up and the like of elongate timber items with two substantially parallel, longitudinal surfaces achieved by processing, during longitudinal feed of the item, including determination of a given lateral position and/or form of the item at at least one position along the item, e.g., a cross-section or cross-sectional element, with the aid of sensing means. The method determination takes place with the aid of touch-free distance-sensing means with predetermined measuring directions, fixed and discrete, for determining distances to at least two measuring points on the surface of the timber item, said measuring points being substantially in a cross-section or cross-sectional element of the timber item and on either side of a reference line across the cross-section or cross-sectional element. The sensing takes place in two completely or partially counter-directed measuring directions, which, as seen in the longitudinal direction of the timber item, substantially meet or intersect each other at a point situated on the reference line, where the respective measuring direction, seen in the longitudinal direction of the timber item, forms an angle to the reference line, and/or takes place in at least two measuring directions parallel to the existing processing plane and parallel to the reference line, the distance information thus obtained being utilized for determining a given lateral position and/or shape.

39 Claims, 2 Drawing Sheets

METHOD IN DETERMINING PRIMARILY THE FORM AND/OR THE POSITION OF ELONGATE TIMBER ITEMS AND APPARATUS FOR CARRYING OUT THE METHOD

The present invention relates to a method primarily in scaling, sorting, processing, cutting up and the like of elongate timber items, such as logs or elements thereof with two substantially parallel, longitudinal surfaces achieved by processing, preferably during longitudinal feed of the item, including determination of a given lateral position and/or form of the timber item at at least one position along the item, a cross-section or cross-sectional element, with the aid of sensing means.

The invention also relates to an apparatus for carrying out the method.

The invention is primarily intended for utilization before, after or in the processing of timber items, such as during cutting-up, sawing etc. The information as to the dimension, shape and/or position of the timber item can be used in different processes for yield-heightening process control as well as for administrative purposes such as production control, supervision, reporting etc.

Certain magnitudes specific to timber can be determined with the aid of the invention. For example, a long diameter or chord can be determined as to its magnitude and/or position for a given cross-section or cross-sectional element. Furthermore, in connection with log trimming and log re-sawing, slab cut displacement ("slab cut" being here defined as one of two parallel, flat surfaces on the timber item, where these surfaces can be achieved by some form of processing, usually by sawing off the so-called slabs) and centering errors or certain other important magnitudes specific to the process can be determined with respect to the shape and/or position of the timber item.

In centering log trimming, for example, a log is processed during longitudinal feed so that two slab cuts are formed as opposing sides along the log. Centering errors signify that critical cross-sectional elements of the log, preferably at the top end thereof, are processed asymmetrically, so that there is a significant difference in the width of the slab cuts. In such as case, the possibilities of extracting timer products with no, or heavily limited wane from the timber in subsequent cutting-up operations is usually reduced. Normally, the sawing yield is usually drastically reduced, even for apparently small centering errors.

By applying the invention in the mentioned centering log trimming sawing, the centering error can already be determined as to direction and magnitude before cutting-up, whereby the log and/or processing tools can be laterally displaced so that the centering error decreases. The slab cut displacement is thus reduced, with an increase of the sawing yield as a result, provided that the frame saw setting pattern is adjusted to the dimension of the logs.

The positive effects of a feed-back system according to the above will be considerable when the invention is based on an effective metrological concept.

In general, the metrological concept of the invention is such that key information relating to the dimensions, shape and/or position of a log can be determined in an extremely simplifying manner. In most applications for which the invention is intended, there is required a very limited number of measuring directions and transducers. In addition, signal processing and algorithms will be comparatively uncomplicated, since detected magnitudes have simple relationships with the appropriate magnitudes for control. In the most important applications, no complicated external communication is necessary with respect to input data to the system. The sensing means utilize touch-free transducer technique, and in important applications are entirely without moving parts and are placed on the upper part of an existing support structure where they are not affected by falling contaminants. In certain applications the sensing means are substantially independent of the dimension, diameter and the like of the logs, in spite of the measuring directions being fixed. It is worth pointing out that the log cross-section is of course not circular but has minor deviations in shape, e.g. corresponding, varying radii of curvature. The invention is adjusted to this reality by key magnitudes being detected in combination with well-chosen approximations.

Apparatus in accordance with the invention will thus be simple to install and maintain. The price:performance relationship is extremely advantageous for the most important applications.

The above described application in connection with log trimming is an example. The invention can also be applied as measuring means for timber items to determine suitable cutting-up patterns, so-called setting patterns. Conversely, the invention can be used for sorting sawn timber against a given cutting-up pattern. The invention may be used for compensation measuring of timber items as well as basis for cross-cutting and the like. The invention can also be used in connection with re-sawing for determining, inter alia, the slab cut width, the displacement of the slab cut and centering errors on timber logs with at least two parallel surfaces for processing in the longitudinal direction of the timber item.

Common to the applications is the effective metrological concept of the invention, which in important applications gives unique technical advantages and/or cost advantages.

Different embodiments can be selected within the scope of the invention, the obtained information depending on the embodiment, and thus such information can be selected against the background of the application in question. This creates, as should have already become apparent, great flexibility with respect to the fields of use.

The invention thus refers to a method primarily in scaling, sorting, processing, cutting-up and similar working of elongate timber items, such as logs or elements thereof with two substantially parallel longitudinally surfaces achieved by processing, preferably during relative longitudinal feeding, including the determination of a given lateral position and/or shape of a timber item at at least one position along the item, a cross-section or cross-sectional element, with the aid of sensing means. The method is particularly distinguished by the determination taking place with the aid of touch-free distance-sensing means with predetermined measuring directions, preferably fixed and discrete, for determining distances to at least two measuring points on the surface of the timber item, these measuring points being substantially in a cross-section or cross-sectional element of the timber item and on different sides of a reference line across the cross-section or cross-sectional element, sensing taking place in two completely or partially opposing measuring directions and seen in the longitudinal direction of the timber item, these directions substantially meet or intercept each other at a point preferably situated on the reference line, where, seen in the longitudinal direction of the timber item, the respective measuring direction forms an angle to the reference line, and/or taking place in at least two measuring directions parallel to the processing plane, these directions being parallel to said reference line in the longitudinal direction of the timber item, distance information thus obtained being primarily utilized for determining a given lateral position and/or shape.

The invention also relates to an apparatus primarily for scaling, sorting, processing, cutting-up and the like of elongate timber items, such as logs of elements thereof with two substantially longitudinal surfaces achieved by processing, preferably during relative longitudinal feed, including means for determining a given lateral position and/or shape of a timber item at at least one position along the item, a cross-section or cross-sectional element, with the aid of sensing means. The apparatus is particularly distinguished in that touch-free distance-sensing means with predetermined measuring directions, preferably fixed and discrete, are arranged for determining distances to at least two measuring points on the surface of the timber item, these measuring points here being intended to be situated substantially in a cross-section or cross-sectional element of the timber item on different sides of a reference line across the cross-section or cross-sectional element, the means being arranged for sensing in two completely or partially opposing measuring directions, and seen in the longitudinal direction of the timber item, these directions substantially meet or intercept each other at a point preferably situated on the reference line, where, seen in the longitudinal direction of the timber item, the respective direction forms an angle to the reference line, and/or taking place in at least two measuring directions parallel to the processing plane, these directions being parallel to said reference line in the longitudinal direction of the timber item, distance information thus obtained being primarily utilized for determining a given lateral position and/or shape.

Figure 2:
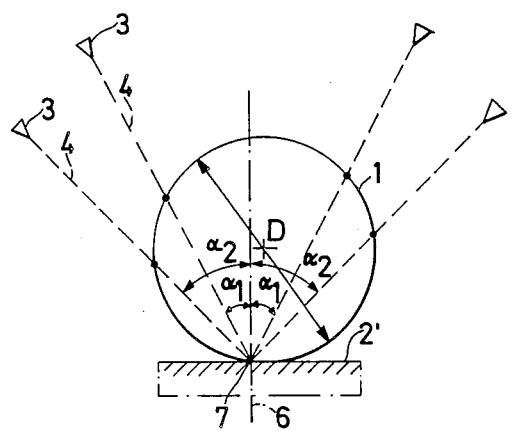
Figure 3:
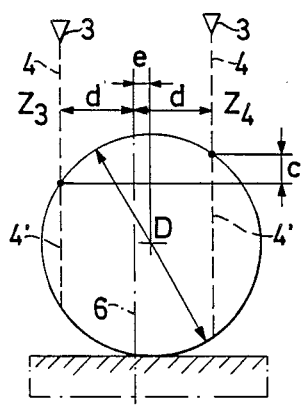
Figure 4:
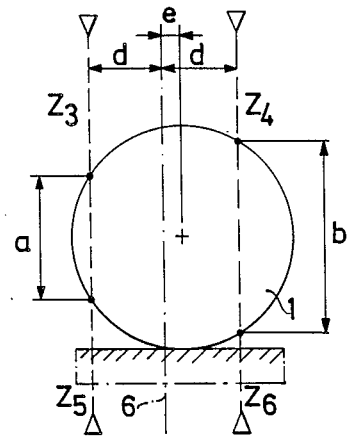
Figure 5:
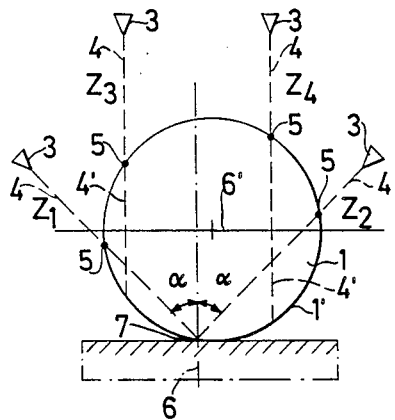
Figure 6:
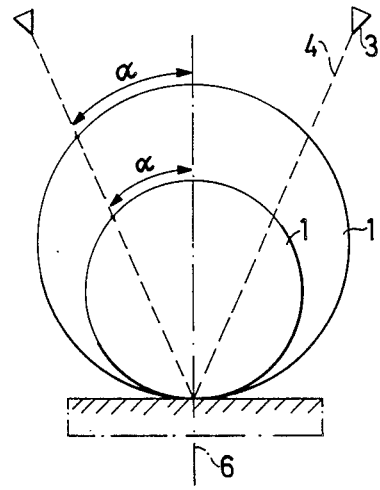
Figure 7:
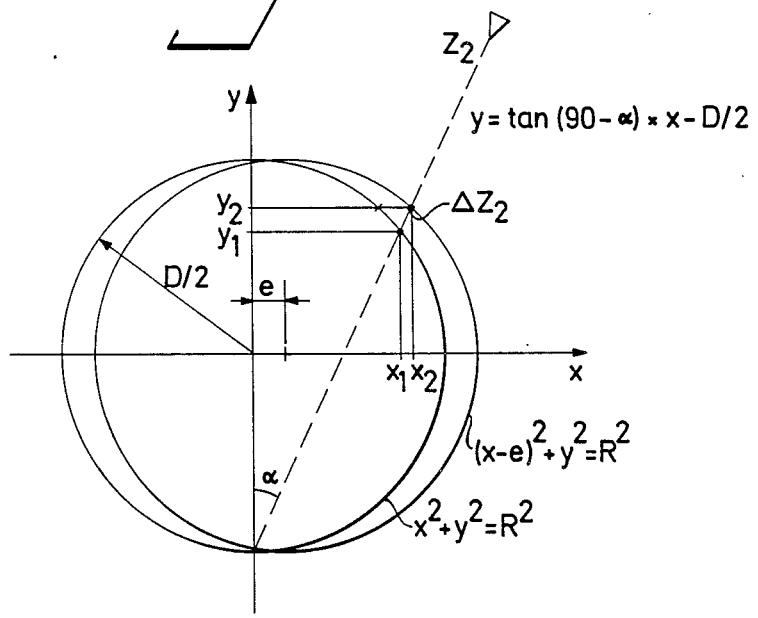

The invention will now be described in more detail in connection with embodiment examples and the accompanying drawings, where FIG. 1 schematically illustrates a first embodiment of an apparatus in accordance with the invention, seen in the longitudinal direction of the timber item on which measurement is to take place;

FIG. 2 schematically illustrates a second embodiment of an apparatus in accordance with the invention, seen as in FIG. 1;

FIG. 3 schematically illustrates a third embodiment of an apparatus in accordance with the invention seen as in FIG. 1;

FIG. 4 schematically illustrates a fourth embodiment of an apparatus in accordance with the invention seen as in FIG. 1;

FIG. 5 schematically illustrates a fifth embodiment of an apparatus in accordance with the invention, seen as in FIG. 1;

FIG. 6 schematically illustrates the use of the apparatus primarily according to FIG. 1, in differently large cross-sections; and FIG. 7 schematically illustrates certain parameters etc. in a cross-sectional plane.

In the Figures the numeral 1 denotes an elongate timber item, such as a log, and 2 a merely indicated conveyor or other suitable support structure for carrying the timber item 1. The illustrated cross-section of the timber item has been approximated to a circular cross-section in the Figures. Sensing means denoted by 3 comprise touch-free sensing means with discrete, predetermined and preferably fixed measuring directions 4 (denoted by dashed lines) arranged for determining distances $Z_1$, $Z_2$ to at least two measuring points 5 on the surface 1' of the timber item 1. The measuring points 5 are substantially in a cross-section or cross-sectional element of the timber item. By "cross-sectional element" is intended here an element between two cross-sections, such as a disc, of the timber item, this element in practice being equivalent to a cross-section. A certain length displacement between two mutually corresponding measuring points, such as the right hand and left hand ones in FIG. 1, can occur in taking measurements in sequence during longitudinal feed of the timber item. The term "cross-section" is used hereinafter, this term also including cross-sectional elements in applicable cases. The measuring points 5 are on different sides of a reference line 6 on the cross-section, as illustrated in FIG. 1.

In the embodiment illustrated in FIG. 1, the distance-sensing means 3 are adapted for sensing in two partially counter-directed measuring directions, and seen in the longitudinal direction of the timber item they substantially intersect each other in the plane 2' at a point 7 preferably situated on the reference line 6, at the point 7 the respective measuring direction forms an angle denoted by $\alpha$ in FIG. 1, as seen in the longitudinal direction of the timber item. It is preferred, as illustrated in FIG. 1 that the angles corresponding to both measuring directions 4 are equal. The angle $\alpha$ is substantially less than 45° in the embodiment illustrated in FIG. 4. A certain deviation from the reference line in the position of the timber item is illustrated in FIG. 1. There is a certain lateral displacement e, so-called centering error or laying error e. If sections for processing planes are inserted substantially parallel to and symmetrical about the reference line 6, there will be asymmetry as to size and position of the slab cuts, which can be given in the form of so-called slab cut displacement, which approximately agrees with the positional difference c in FIG. 1, providing that a suitable angle $\alpha$ is selected. A suitable angle is about 30° C. in many cases, irrespective of the dimension of the logs. The angle $\alpha$ is always an acute or right angle, i.e. the angle is always expressed here as an acute angle in the case where it is not right angle.

In the embodiment illustrated in FIG. 2 there are sensing means 3 for sensing in two pairs of partially counter-directed directions 4, the angles $\alpha_2$, $\alpha_1$ being respectively 45° for one pair and substantially less than 45°, e.g. about 30° for the other pair. It is preferred here, as with embodiments according to FIG. 1 that both partially counter-directed directions 4 substantially intersect each other in the plane 2' and, as previously mentioned, on the reference line 6. In the case where the angle $\alpha_2$ is 45° and remaining conditions are according to FIG. 2, the apparatus is further arranged for determining the diameter d of the cross-section as to magnitude and/or lateral position, which thus constitutes magnitudes specific to the timber.

In the embodiment illustrated in FIG. 3 there are distance-sensing means 3 of the kind mentioned for sensing in at least two measuring directions parallel to the processing plane, these measuring directions being parallel to the reference line as seen in the longitudinal direction of the timber item. The distance part $Z_3$, $Z_4$, which are detemined, together with the diameter D of the cross-section are the base for determining e and c. According to a preferred embodiment the directions 4 substantially coincide with two processing planes 4'.

An embodiment is illustrated in FIG. 4 where there are two pairs of opposing sensing means 3 and where the sensing means 3 of the respective pair are arranged for sensing in a common plane, the pairs being mutually arranged so that sensing takes place along substantially parallel lines which are also parallel to the reference line 6, and according to preferred embodiments coinciding with two processing planes. This sensing means arrangement is primarily disposed for providing the basis for determining a, b, c, e and D.

In the embodiment illustrated in FIG. 5 there are distance sensing means 3 partly disposed according to FIG. 3 and partly according to FIG. 1 with $\alpha = 45°$, this arrangement being disposed for the determination of D, e and c.

In many applications there are measuring points 5 on the same side of a centre line 6' substantially at right angles to the reference line 6 and the processing plane 4', the centre line 6' relating to a cross-section of the timber item including or substantially including the points 5. Certain deviations can occur, however, as according to FIG. 5.

The method in accordance with the invention, as well as the function of the apparatus according to the invention should have been perceived to an essential extent from the above.

The distance information obtained with the aid of the means 3 is intended primarily for determining a given lateral position and/or shape. There are means for registering the measuring values and the processing for the production of the desired information such as centering error, slab out displacement and cross-sectional dimensions, e.g. in the form of the diameter of cross-sections approximated to circular cross-sections, these means being such as suitably programmed conventional computers of a suitable kind. These means include, inter alia, programs for electronically filtering signals, calculation and control etc.

From the determined distances $Z_1$ and $Z_2$ according to FIGS. 1 and 5 correspondingly in FIG. 2, as well as $Z_3$ and $Z_4$ according to FIGS. 3, 4 and 5 and $Z_5$ and $Z_6$ according to FIG. 4, the magnitude of a, b, c, D, e be approximately determined from simple trigonometrical relationships in applicable cases. In more sophisticated systems, more complicated relationships can be conceived.

More important functional relationships have been gathered together in FIG. 7, and these may be a starting point for determining specific process and timber magnitudes with regard to embodiments having partially counter-directed measuring directions. In applications the difference value $Z_1 - Z_2$ is preferably utilized, and here the effect of the movements or position in the y-axis of the cross-section can be neglected in practice. Some important relationships in connection with applications having counter-directed measuring directions will thus be:

$e \approx (Z_1 - Z_2) \times f(\alpha)$
$c \approx (Z_1 - Z_2) \times g(\alpha)$ if $\alpha$ is suitably selected
$D \approx (Z - Z_2) \times h(\alpha)$ if $\alpha$ is suitably selected.

The simplified algorithms according to the above will be independent of the dimension, such as cross-sectional diameter or the equivalent, of the logs. The functional relationships f, g and h are elementary. In the relationships above, calibration functions, weighing functions and the like have been excluded.

In applications relating to mutually parallel measuring directions according to FIG. 3 the following relationships are applicable for determining centering error e and slab cut displacement c.

$e \approx (Z_3 - Z_4 \cdot F(d,D)$
$c \approx Z_3 - Z_4$

As previously, in this application, there is preferably utilized the difference value $Z_3 - Z_4$, the effect of moderate movements or positional displacements in the measuring direction being negligible. The functional relationship F is elementarily trigonometric. In the embodiment according to FIG. 3, a knowledge a D and d is required for determining e. The algorithm will thus be dependent on the timber dimension. The effect is minor, however, for moderate dimension changes, such as normal conicity within a log, for example. With parallel measuring directions according to FIG. 3, c and the position of the slab cut can be determined with very great accuracy.

In applications according to FIG. 4, the width and the relative mutual positions of the existing, parallel slab cut, where:

$a \approx Z_3 - Z_5$
$b \approx Z_4 - Z_6$
$c_1 \approx Z_3 - Z_4$
$c_2 \approx Z_5 - Z_6$ The information can be utilized directly for such as process control in connection with log trimming or re-sawing or may be included in algorithms determining such as e and D according to the following:

$$e \approx \frac{b^2 - a^2}{16d}$$

$$D \approx 2 \left( e^2 + \frac{a^2 + b^2 + 8d^2}{8} \right)^{\frac{1}{2}}$$

d is included in the relationships according to the above, and in most applications it will be the block height, i.e. the distance between the longitudinal, parallel processing surfaces. Information as to the appropriate block height is usually easily available, preferably as electrical, digital signals in servo-controlled sawing plant systems or as manual input data in fixed saw-setting pattern sawing plant systems.

From the above it should be seen that the different signals obtained by distance measurements in accordance with the invention will be, in the determination of such as centering error or slab cut displacement, practically independent of whether the cross-sectional diameter is changed due to the log conicity. In this way, inter alia, a, e and c can be determined along the timber item also e.g. during relative longitudinal movement between timber item and sensing means.

As should be clear, measuring errors occurring due to moderate lateral displacements will be small as a result of the geometrical conditions.

Information relating to lateral position and/or cross-sectional shape of the timber item can be utilized in several ways. According to one embodiment, there are unillustrated means of a suitable, conventional kind for selecting, on the basis of what has thus been determined, the displacement and adjustment of the position, and/or machine tool position for the timber item in order to achieve the best yield of the available timber items.

As should have been understood from the above, the invention affords the possibility of determining key data concerning magnitudes specific to process and/or timber with great flexibility, high operational reliability and relatively low cost.

Hereinbefore the invention has been described in connection with embodiment examples. Of course, more embodiments and fields of use can be conceived without departing from the inventive concept.

Thus, as will be seen from the above, the method and apparatus can be utilized in a plurality of different applications. More applications than those set forth can be conceived. The selection of processing conditions can take place on the basis of measurements in accordance with the invention. The result of the processing can be determined on the basis of measurements in accordance with the invention. Accordingly, an application can be carried out such that sensing and determination take place in conjunction with a definite station, such as a sawing machine, e.g. a log trimming saw, the information on the shape and/or position etc. of the timber item being used for process control or the like in another station, such as another sawing machine, e.g. a re-sawing machine.

To advantage, the invention is applicable in conjunction with log re-sawing machines such as for straight sawing, curved sawing or a combination of these for a single timber block. The invention is naturally applicable to non-centering sawing, i.e. offset sawing, such as taper-sawing as well as through and through sawing of logs.

Other variations than those illustrated in the Figures are naturally conceivable.

The distance-sensing means 3 can thus be arranged so that an acute angle $\alpha$ is formed between the measuring direction 4 and the reference line 6, either so that the apex formed is directed towards the support structure 2 or away from the support structure 2.

In addition, embodiments can be conceived where $\alpha$ is substantially 90°, i.e. the measuring direction with such an angle is substantially at right angles to the reference line 6.

It is worth pointing out that the reference line does not need to extend substantially parallel to an existing processing plane but can extend substantially at right angles to such a plane, for example.

Further variations relating to mutual transducer placing etc. can also be conceived. Accordingly, the measuring direction may be different for one pair of partially counter-directed transducers, i.e. the angle $\alpha$ in FIG. 1 does not need to be the same for both transducers. The transducer distance d to the reference line does not need to be the same for both transducers in a pair for transducers arranged on either side of the reference line.

It has been stated above that the preferred angle for $\alpha$ is about 45° for determining the position and magnitude of D and about 30° for determining c and/or e. However, it is also conceivable as a suitable compromise to use about 37° instead of about 45° and 30° C. Other angles are also conceivable.

In many applications it may be suitable to use two pairs of transducers in one cross-sectional plane for increasing the certainty of decision in this way. In such a case the measuring results from each pair can be compared, a certain measure being taken if the result from both pairs points to the suitability thereof. An example is illustrated in FIG. 2, where the result from measuring with the angle $\alpha$ =about 45° and $\alpha$=about 30° can be compared with the starting point, e.g. from e.

A plurality of known touch-free, distance-measuring means 3 of generally known types such as optoelectronic types can be conceived. The means can be implemented with a substantially discrete measuring direction, in practice with a certain amount of expansion corresponding to a measuring spot. The means can also include a so-called scanner function so that the measuring spot is moved in a controlled manner. This moving can take place e.g. by the measuring direction being changed or by the measuring direction being moved parallel. The measuring means 3 can also be arranged movable, such as with the ability to travel or to be rotated or the like. By "predetermined measuring directions" is intended here that the work of determination depends on the measuring directions but that these directions do not necessarily need to be explicity known.

As mentioned, it is preferable that sensing takes place during relative longitudinal feed between the sensing means and the timber item. Embodiments can be conceived where the sensing means 3 are arranged at more than one place in an axial direction, with the object of detecting a larger part of the timber item in this longitudinal direction during limited relative longitudinal feed. However, in many applications it is quite satisfactory only to sense a part of the timber item, this part being limited longitudinally.

It can also be conceived that there are sensing means which are displaceable in an axial direction, determination being enabled by such axial displacement of the sensing means while the timber item is not moved. It is worthy of pointing out here that by "processing plane" can be intended here the slab cuts of a timber item, or the plane of the tool, such as the plane of the saw in the sawing station in question or a previous or subsequent sawing station.

The invention shall thus not be regarded as restricted to the above-mentioned embodiments, and it can be varied within the scope of the accompanying claims.

I claim:

1. Method in working of elongate timber items, including logs and elements thereof with two substantially parallel, longitudinal surfaces achieved by processing, during longitudinal feed of the timber item, including the steps of: determination of a given lateral characteristic, such as position and form, of the timber item at at least one position along the item including the step of sensing with the aid of sensing means which sense distances from the sensing means to the surface of the timber item, longitudinally moving the timber item and the sensing means relative to each other, disposing said timber item on a support path surface spaced apart from said sensing means, the step of sensing taking place with the aid of touch-free distance-sensing means (3), with discrete, predetermined measuring directions, for determining the distance from said sensing means to at least two measuring points (5) on the surface (1') of the timber item (1); said measuring points being substantially in a cross-section of the timber item and on different sides of a reference line (6) transverse to the support path and across the said cross-section; accomplishing the step of said sensing along at least two selected separate measuring directions from a plurality of measuring directions, two of said plurality of measuring directions, which can be selected, being directions along two parallel paths and another two of said plurality of measuring directions, which can be selected, being directions along two at least partially counter-directed directions (4) which are transverse to the longitudinal direction of the timber item, intersect each other and where each of said respective counter-directed measuring directions (4), seen in the longitudinal direction of the timber item, intersect to form an angle ($\alpha$) to a vertical line from the support path surface, and the two measuring directions which can take place in at least two parallel directions (4) are parallel to processing planes (4'), along the longitudinal direction of the timber item, and parallel to said reference line (6), the sensed distance information to said timber item thus obtained being utilized for determining a given lateral characteristic of said timber item.

2. Method as claimed in claim 1, characterized in that said measuring points (5) occur on the same side of a diametral centre line (6') substantially at right angles to the reference line (6) and the processing planes (4'), said centre line (6') relating to a cross-section of the timber item substantially including said points (5).

3. Method as claimed in claim 1, characterized in that both said at least partially counter-directed directions (4) are caused substantially to intersect each other essentially at the support surface (2') in which the timber item is supported.

4. Method as claimed in claim 1, characterized in that said angle ($\alpha$), expressed as an angle ($\alpha$) is substantially 45°.

5. Method as claimed in claim 3, characterized in that in appropriate cases the obtained distance information is utilized for determining a magnitude specific to the timber and substantially corresponding to a circular cross-section diameter (D) as to magnitude.

6. Method as claimed in claim 1, characterized in that said angle ($\alpha$), expressed as an acute angle ($\alpha$) is about 30°.

7. Method as claimed in claim 3, characterized in that the angle ($\alpha$) is selected such that the obtained distance information can be utilized in appropriate cases for determining the displacement relating to the mutual positions of the longitudinal, parallel surfaces.

8. Method as claimed in claim 1, characterized in that sensing takes place in two pairs of partially counter-directed measuring directions (4), said angle ($\alpha$), expressed as an acute angle ($\alpha$), being substantially 45° for one pair and substantially less than 45°, such as about 30° for the other pair.

9. Method as claimed in claim 1, characterized in that an acute angle ($\alpha$) is used, said angle being about 37°.

10. Method as claimed in claim 1, characterized in that sensing takes place in directions (4) substantially in two existing processing planes (4').

11. Method as claimed in claim 1, characterized in that said determination takes place with the aid of two pairs of opposing sensing means (3), the means of the respective pair being adapted for sensing in a common plane and that sensing with the pairs of means takes place along mutually, substantially parallel lines.

12. Method as claimed in claim 1, characterized in that sensing takes place in a pair of partially counter-directed measuring directions (4) and in a pair of mutually parallel measuring directions (4) each on either side of the reference line (6).

13. Method as claimed in claim 1, including the step of utilizing the position of said measuring points (5) for determining a circular cross-section as to at least one of the position and dimension characteristics of the timber item, and constituting an approximation of the cross-section of the timber item (1).

14. Method as claimed in claim 1, including the further step of using what has thus been determined by said sensing means as the basis of the selection of suitable manipulation such as displacement, rotation and setting of the position of the timber item.

15. Method as claimed in claim 1, characterized in that said determination takes place at a plurality of positions along the timber item.

16. Method as claimed in claim 15, characterized in that said determination takes place with sensing means situated at more than one place along the intended longitudinal direction.

17. Method as claimed in claim 1, characterized in that said determination takes place at a definite processing station, in connection with a log trimming saw, and is also utilized for process control in another processing station, a re-sawing station.

18. Apparatus, including support structure with a support surface for working of elongate timber items, including logs and elements thereof with two substantially parallel longitudinal surfaces on said timber items achieved by processing, during relative longitudinal feed of the timber item along said support surface, and further including means, including sensing means, for determining a given lateral characteristic of a timber item at at least one position along the item with the aid of said sensing means, wherein said sensing means are touch-free distance-sensing means (3), with discrete predetermined measuring directions, for determining distances from said sensing means to at least two measuring points (5) on the surface (1') of the timber item (1), said measuring points being substantially on at least a part of a cross-section of the timber item and on different sides of a reference line (6) transverse to said support surface and across at least a part of the timber item cross-section, said touch-free distance sensing means (3) enabling sensing in at least one set of two separate measuring directions selected from sets consisting of a set of at least two parallel measuring directions and a set of at least two at least partially counter-directed measuring directions (4) which, viewed along the longitudinal direction of the timber item, intersect each other at a point (7) and where each of said respective counter-directed measuring directions (4), seen in the longitudinal direction of the timber item, intersect to form an angle ($\alpha$) to a vertical line transverse to said support surface and the measuring directions of sensing which can take place in said set of at least two parallel measuring directions (4) will be parallel to the existing processing planes (4'), along the longitudinal direction of the timber item, and parallel to said reference line (6), whereby the sensed distance information thus obtained can be utilized for determining a given lateral characteristic of said timber item.

19. Apparatus as claimed in claim 18, characterized in that said measuring points (5) are intended to be on the same side of a diametral centre line (6') substantially at right angles to the reference line (6) and processing plane (4'), said centre line relating to a cross-section of the timber item substantially including said points.

20. Apparatus according to claim 18, characterized in that sensing means (3) are arranged such that both said at least partially counter-directed directions substantially intersect each other at the support path surface (2') in which the timber item is supported.

21. Apparatus as claimed in claim 18, characterized in that said angle (α), expressed as an acute angle (α) is substantially 45°.

22. Apparatus as claimed in claim 20, characterized in that there are means for utilizing the distance information obtained, in appropriate cases, for determining the characteristic of a magnitude specific to the timber item and essentially corresponding to the diameter (D) of a circular cross-section.

23. Apparatus as claimed in claim 18, characterized in that said angle (α) expressed as an acute angle (α) is less than 45°, and about 30°.

24. Apparatus as claimed in claim 20, characterized in that there are means for utilizing the positional information obtained, for determining displacement relating to the relative mutual positions of the longitudinal parallel surfaces.

25. Apparatus as claimed in claim 18, characterized in that there are sensing means (3) for sensing in two pairs of partially counter-directed directions (4), said angle (α), expressed as an acute angle (α), is substantially 45° for one pair and substantially less, about 30°, for the other pair.

26. Apparatus as claimed in claim 18, characterized in that angle (α) is an acute angle being about 37°.

27. Apparatus as claimed in claim 18, characterized in that there are sensing means (3) arranged for sensing in directions (4) in substantially two processing planes (4').

28. Apparatus as claimed in claim 18, characterized in that there are two pairs of opposing sensing means (3), the sensing means of the respective pairs being adapted for sensing in a common plane, the pairs being mutually adapted such that sensing takes place along substantially parallel lines.

29. Apparatus as claimed in claim 18, characterized in that there are sensing means (3) arranged for sensing in a pair of partially counter-directed measuring-directions (4) and also a pair of mutually parallel measuring directions (4) one on either side of the reference line (6).

30. Apparatus as claimed in claim 18, characterized in that there are means for determining, on the basis of the position of said measuring points (5), the characteristic which is at least one of the position and the dimension of a circular cross-section constituting an approximation of a cross-section of the timber item.

31. Apparatus as claimed in claim 18, further including means for selecting, on the basis of what has been thus determined by said distance sensing means, a suitable displacement and setting of the position of the timber item.

32. Apparatus as claimed in claim 18, characterized in that there are sensing means arranged at more than one place along the intended longitudinal direction.

33. Apparatus as claimed in claim 18, characterized in that there are means for said determination in a given processing station, in connection with a log trimming saw and also for utilization, for process control, in another processing station, a re-sawing saw.

34. Method as claimed in claim 1, including the further step of using what has thus been determined by said step of sensing as the basis of the selection of suitable manipulation such as displacement and setting of a processing tool.

35. Method as claimed in claim 1, including the further step of using what has thus been determined by said step of sensing as the basis of the selection of suitable manipulation such as displacement, rotation and setting of the position of the timber item and of a processing tool.

36. Apparatus as claimed in claim 18, further including means for selecting, on the basis of what has been thus determined by said distance sensing means, a suitable displacement and setting of the position of the timber item and of a processing tool.

37. Apparatus as claimed in claim 18, further including means for selecting, on the basis of what has been thus determined by said distance sensing means, a suitable displacement and setting of a processing tool.

38. A method of working timber items, as claimed in claim 1, wherein the intersection point of said two partially counter-directed measuring directions lies on said reference line.

39. An Apparatus for working elongate timber items as defined in claim 18, wherein said sensing means, which enable sensing in a set of measuring directions which are at least partially counter-directed measuring directions, are fixed relative to said support structure support surface so that the lines of said set of measuring directions intersect at a point which lies on said reference line.

* * * * *

UNITED STATES PATENT AND TRADEMARK OFFICE
CERTIFICATE OF CORRECTION

PATENT NO. : 4,982,772
DATED      : January 8, 1991
INVENTOR(S): HANS DUTINA

It is certified that error appears in the above-identified patent and that said Letters Patent is hereby corrected as shown below:

Column 1, line 44, "as" should be --a--.

, line 45, "timer" should be --timber--.

Column 5, line 63, the value of "(Z-z2)" should be --($Z_1 - Z_2$)--.

Column 6, line 16, "a D" should be --of D--.

Signed and Sealed this

Twelfth Day of May, 1992

Attest:

DOUGLAS B. COMER

*Attesting Officer*      Acting Commissioner of Patents and Trademarks